United States Patent [19]

Marshall

[11] Patent Number: 5,144,993
[45] Date of Patent: Sep. 8, 1992

[54] SINGLE BLADE TREE CUTTING APPARATUS

[76] Inventor: Lorry L. Marshall, Box 51, Sargent, Nebr. 68874

[21] Appl. No.: 820,345

[22] Filed: Jan. 14, 1992

[51] Int. Cl.⁵ .................. A01G 23/08; B27B 5/14
[52] U.S. Cl. ........................ 144/34 R; 83/600; 83/675; 83/928; 144/3 D; 144/336
[58] Field of Search ............ 83/600, 601, 675, 679, 83/928; 144/3 D, 34 R, 34 E, 336, 339

[56] References Cited

U.S. PATENT DOCUMENTS

| | | | |
|---|---|---|---|
| 2,529,934 | 11/1950 | Gracey et al. | 144/34 |
| 3,122,184 | 2/1964 | Larson | 144/34 |
| 3,270,787 | 9/1966 | Rehnsfrom | 144/34 E |
| 3,627,002 | 12/1971 | Fulghum, Jr. | 144/34 E |
| 4,046,179 | 9/1977 | Crawford | 144/34 E |
| 4,081,007 | 3/1978 | Loigerot | 144/3 D |
| 4,681,145 | 7/1987 | York | 144/2 N |
| 4,690,185 | 9/1987 | Hamilton et al. | 144/34 R |
| 4,848,425 | 7/1989 | Mercier et al. | 144/34 R |

Primary Examiner—W. Donald Bray
Attorney, Agent, or Firm—Zarley, McKee, Thomte, Voorhees & Sease

[57] ABSTRACT

A tree cutting apparatus includes a frame having forward and rearward ends, with single generally planar blade rotatably mounted on the forward end of the frame. The blade has a cutting edge extending around a portion of the periphery thereof. The cutting edge as a forward and rearward end, with the cutting edge being spaced a distance from the rotational axis of the blade increasing from the forward end to the rearward end, such that the cutting edge of the blade moves transversely with respect to the forward cross-member as the blade rotates to cut a tree or the like.

6 Claims, 4 Drawing Sheets

SINGLE BLADE TREE CUTTING APPARATUS

TECHNICAL FIELD

The present invention relates generally to tree cutting devices, and more particularly to an improved tree cutting apparatus with a slow moving cutting blade.

BACKGROUND OF THE INVENTION

Various apparatus for felling trees are well known. Examples include chain saws, rotary blades such as circular saws, and shear severing devices. Chain saws are subject to frequent failure because of the number of moving parts. Circular saws, while typically stronger and more robust, are also more bulky. Further, both chain saws and circular saws are run at high speeds with the attendant hazard from flying chips and debris. Shear severing devices require enormous amounts of power and leverage to fell trees having a diameter of more than a mere few inches.

To overcome these deficiencies, the inventor devised a tree cutting apparatus which is the subject of co-pending patent application Ser. No. 07/630,266. While the device of that application solved many problems, it required two blades acting simultaneously, with the accompanying mechanical structure for operating a pair of blades. The apparatus of the present invention requires only a single blade, thereby reducing mechanical complexity, materials utilized, and simplifying the structure.

It is therefore a general object of the present invention to provide an improved tree cutting apparatus.

Another object of the present invention is to provide a tree cutting apparatus with a single slow moving blade.

A further object is to provide a tree cutting apparatus which eliminates flying chips and debris during the cutting operation.

Yet another object of the present invention is to provide a tree cutting apparatus which will cut large diameter trees with only minimal power requirements.

Still another object is to provide an improved tree cutting apparatus which is simple in operation, economical to manufacture and light weight for connection to mobile vehicles.

These and other objects will be apparent to those skilled in the art.

SUMMARY OF THE INVENTION

The tree cutting apparatus of the present invention includes a frame having forward and rearward ends, with a single generally planar blade rotatably mounted on the forward end of the frame. The blade has a cutting edge extending around a portion of the periphery thereof, with forward and rearward ends, with the cutting edge being spaced a distance from the rotational axis of the blade increasing from the forward end to the rearward end, such that the cutting edge of the blade moves deeper into a tree as the blade rotates to cut a tree or the like.

DESCRIPTION OF THE PREFERRED EMBODIMENT

Figure 1:
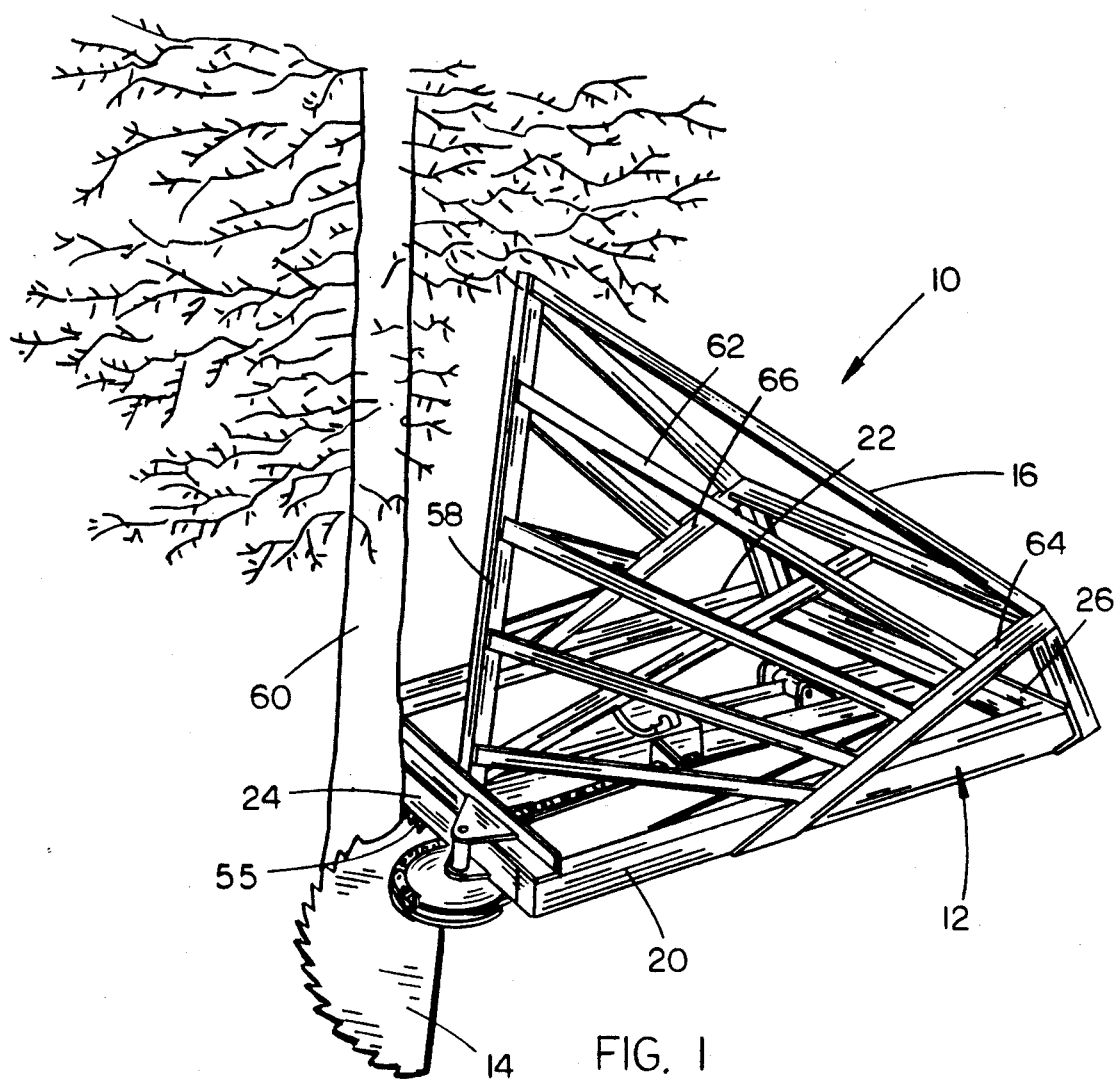
FIG. 1 is a pictorial view of the present invention cutting a tree.

Referring now to the drawings, in which identical or corresponding parts are identified with the same reference numeral, and more particularly to FIG. 1, the tree cutting apparatus of the present invention is designated generally at 10, and includes a frame 12 supporting rotatable blade 14, and a tree deflecting frame 16.

Figure 5:
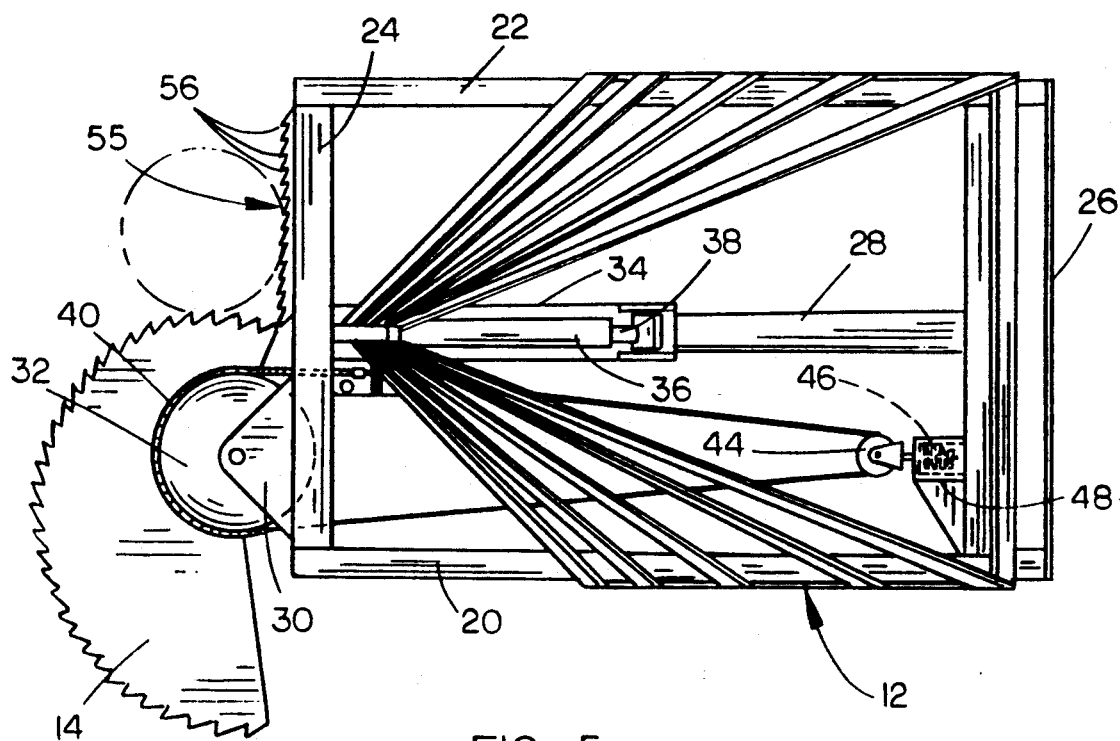
FIG. 5 is a top view of the tree cutting apparatus.

As shown in FIGS. 1 and 5, frame 12 is formed of right and left elongated members 20 and 22, which are oriented in parallel spaced apart relation by a forward cross member 24 and a rearward cross member 26. A central elongated member 28 parallel to right and left elongated members 20 and 22 extends between cross members 24 and 26 and also serves as a guide bearing, as will be discussed in more detail hereinbelow.

A triangular bracket 30 is mounted to forward crossmember 24 and projects forwardly therefrom. A circular hub 32 is rotatably mounted to bracket 30 and depends below and in a plane parallel with frame 12. Blade 14 is mounted on hub 32 for rotation therewith.

Figure 6:
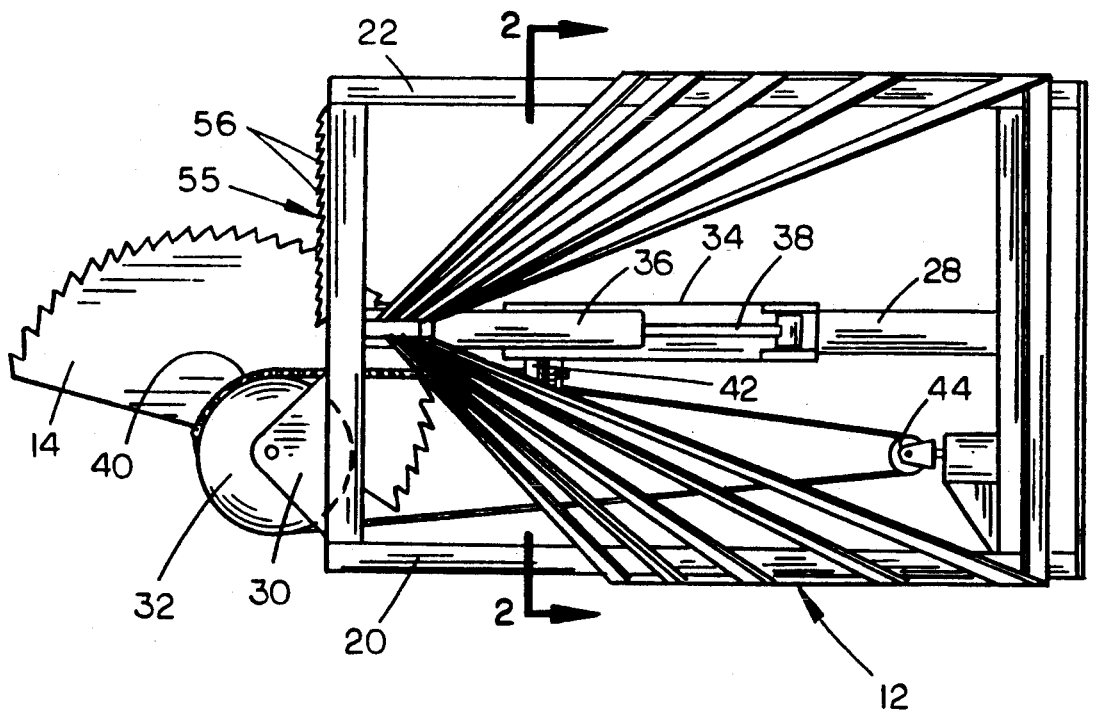
FIG. 6 is a view similar to FIG. 4 with the blade moved to a second position.

A drive bracket 34 is slidably mounted on central elongated member 28, so as to slide between forward cross member 24 and rearward cross member 26 as shown in FIGS. 5 and 6. A hydraulic cylinder 36 is connected at one end to forward cross member 24, with its extensible rod 38 connected to the rearward end of drive bracket 34. Cylinder 36 is preferably a dual action cylinder which will cause drive bracket 34 to operate between the forward position shown in FIG. 5 and the rearward position shown in FIG. 6 upon activation of the cylinder 36.

In order to drive blade 14, a chain 40 is connected at one end to a plate 42 mounted on drive bracket 34, extends to wrap around and engage hub 32, then extends around an auxiliary pulley 44 on rearward cross member 26, and then is connected to plate 42, to form a continuous loop. While a belt or cable may be utilized in place of chain 40, the chain, belt and cable must engage hub 32 so as to rotate the hub upon activation of cylinder 36 and movement of drive bracket 34. As shown in FIG. 5, auxiliary pulley 44 is spring-loaded 46 in a pocket 48 so as to place tension on the continuous loop of chain 40.

Figure 3:
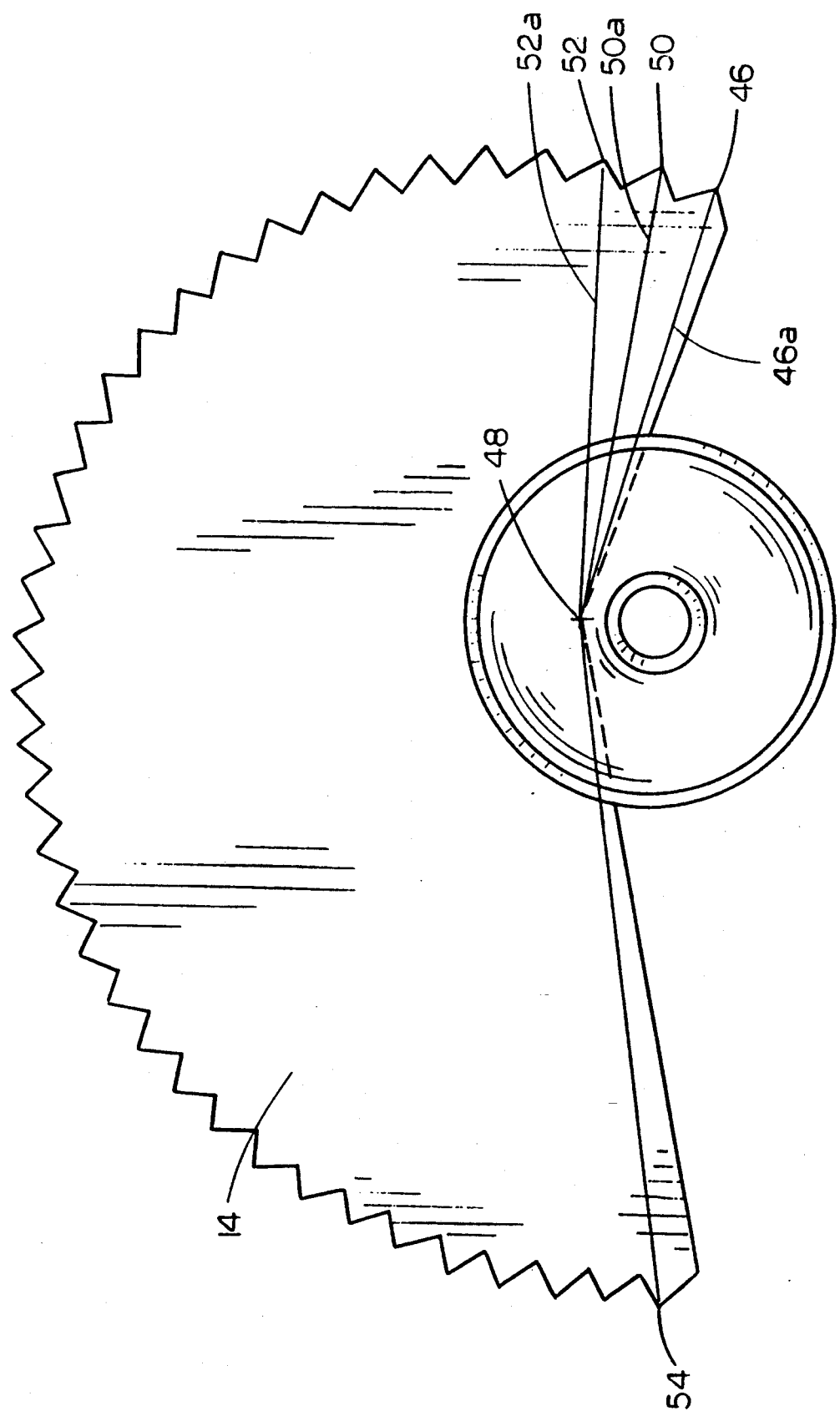
FIG. 3 is a top view of one cutting blade of the present invention.
Figure 4:
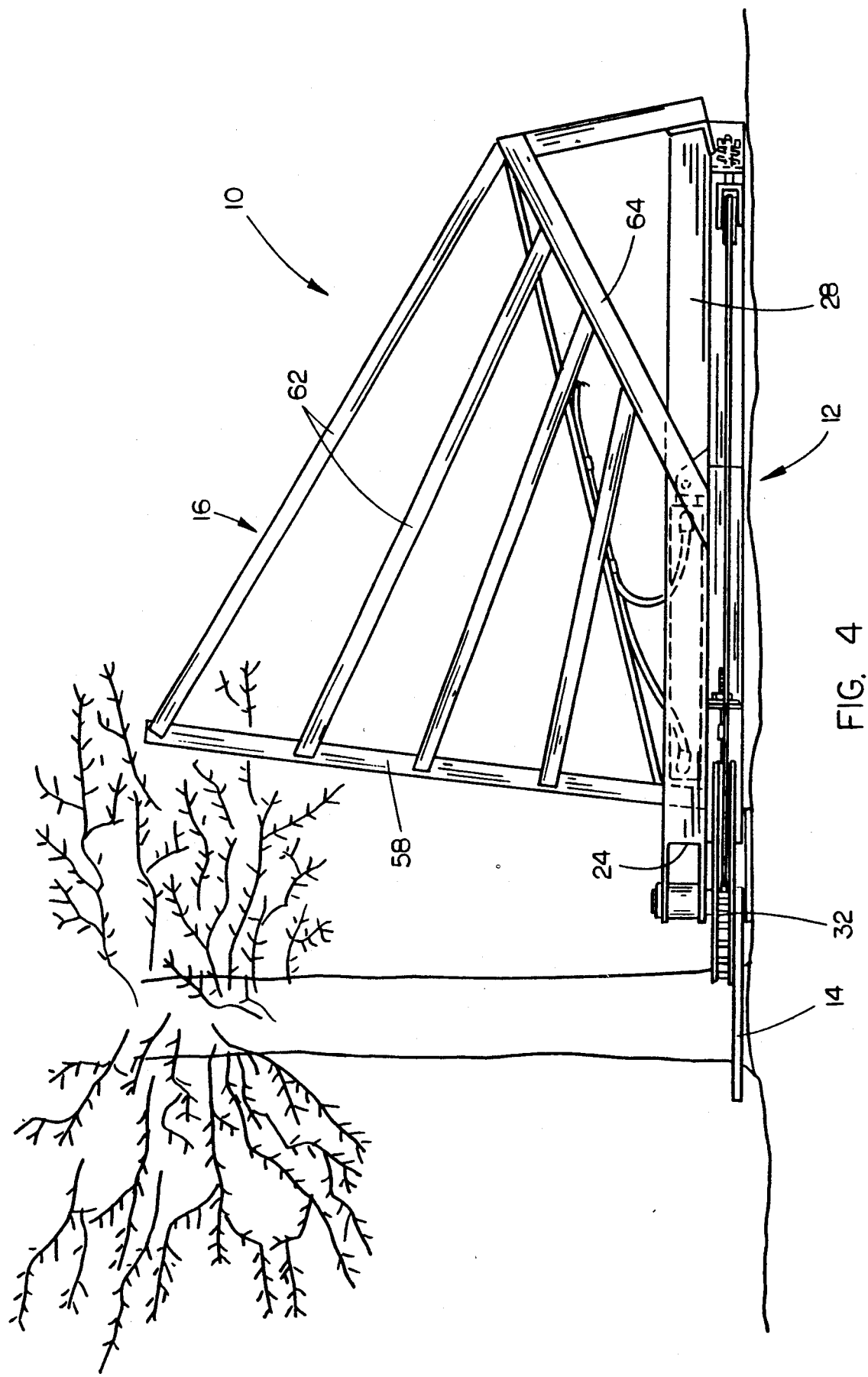
FIG. 4 is a side elevational view of the invention shown in FIG. 1.

Referring now to FIG. 3, blade 14 is enlarged to show the special configuration utilized in the preferred embodiment of the invention. Blade 14 is generally elliptical in shape, and is designed such that each tooth is slightly longer as the blade rotates to cut the tree. In addition, the distance between the teeth decreases slightly throughout the "stroke" or rotation of the blade. As shown in FIG. 3, the first tooth 46 is approximately 14.375 inches from an elliptical center 48. Second tooth 50 is approximately 3/16 of an inch longer, or 14.563 inches from center 48. The distance between first tooth 46 and second tooth 50, as measured between the points, is approximately 7°. Third tooth 52 is again approximately 3/16 of an inch longer than second tooth 50, as measured along cord 52a from center 48. In addition, third tooth 52 is slightly closer to second tooth 50 than second tooth 50 is to first tooth 46. This may be measured by comparing the angular distance between chords 46a and 50a and between chords 50a and 52a. The angular distance between chords 46a and 50a is approximately 7°. The angular distance between chords 50a and 52a is approximately 6.9°. Each subsequent tooth is approximately 3/16 inch longer than the previous tooth, and is approximately 1/10 of a degree closer than the next previous tooth. This sequence continues for approximately 220° to form a cutting edge 55 from first tooth 46 around center 48 to last tooth 54.

As shown in FIGS. 5 and 6, this special spacing and length of the teeth on blade 14 serves to create a uniform pressure or stress as the blade is rotated to cut the tree. As blade 14 rotates, cutting edge 55 moves transversely with respect to forward cross-member 24, through the tree. The spacing and dimensions are designed such that approximately the same number of teeth engage the tree trunk to cut a similar amount of wood at any given point along saw blade 14 during the stroke of cylinder 36. In this way, saw blade 14 must only be rotated approximately 220°, or less, to fell a tree. A single stroke of cylinder 36 will accomplish this task in approximately 10 seconds. The tree will be held in position by a straight blade 55 having teeth 56 mounted to the bottom of forward cross-member 24. Teeth 56 are angled towards right elongated member 20 so as to cut tree trunk 60 if blade 14 forces trunk 60 laterally. Blade 55 is in a plane immediately above the plane of blade 14, to form a single cut.

Figure 2:
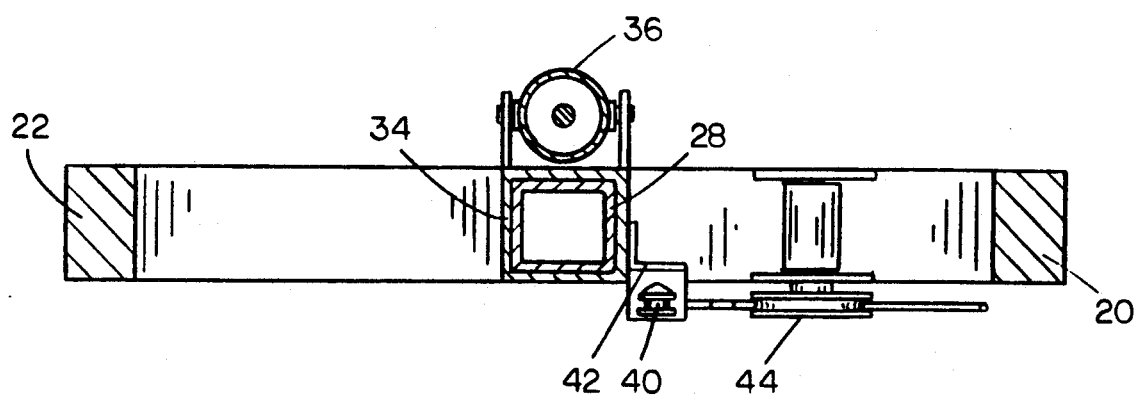
FIG. 2 is a sectional view taken at lines 2—2 in FIG. 6.

As shown in FIGS. 1 and 2, blade 14 is mounted on the bottom of hub 32, so as to be the lowest component of the cutting apparatus 10. In this way, a tree may be cut flush with the ground.

The tree deflecting frame 16 is mounted to frame 12 and serves to deflect a felled tree away from the rearward end of tree cutting apparatus 10. As shown in FIG. 1, deflecting frame 16 has a forward upright 58 which will be located very close to the tree trunk 60 during cutting of the tree. A series of braces 62 extend from upright 58 and diverge therefrom so as to connect with right and left support members 64 and 66. Support members 64 and 66 are preferably canted upwardly from the forward to the rearward ends for ease in connection of braces 62. In this fashion, when the tree 60 is cut, upright 58 and braces 62 will cause the tree to fall to the right or left side of the tree cutting apparatus 10, out of the way of the vehicle to which the tree cutting apparatus 10 is attached.

Whereas the invention has been shown and described in connection with the preferred embodiment thereof, it will be understood that many modifications, substitutions and additions may be made which are within the intended broad scope of the appended claims. For example, a variety of hitching apparatus may be utilized on the rearward end of tree cutting apparatus 10 to permit attachment to a wide variety of vehicles. There has therefore been shown and described an improved tree cutting apparatus which accomplishes at least all of the above stated objects.

I claim:

1. A tree cutting apparatus, comprising:
    a frame having a forward cross-member, a rearward cross-member and opposing longitudinal side members;
    a single, generally planar blade means operably rotatably connected to the forward cross-member of said frame, said blade means positioned forwardly of said forward cross-member to receive material to be cut between said blade means and said forward cross-member;
    said blade means having an arcuate peripheral edge with a cutting edge formed along a portion thereof having a plurality of teeth therealong;
    said blade means being rotatably mounted such that rotation of said blade means in a first direction will cause said cutting edge to move transversely with respect to the forward cross-member as the blade rotates, such that said teeth will saw through a tree located between said blade means and forward cross-member;
    drive means on said frame operably connected to said blade means, for rotating said blade means;
    said arcuate cutting edge being formed with respect to the rotational axis of said blade means and having a forward end and a rearward end;
    said cutting edge being formed such that the distance between the cutting edge and rotational axis increases from the forward end to the rearward end of said cutting edge, such that rotation of said blade in said first direction will cause the cutting edge of said blade means to move transversely with respect to the forward cross-member so as to engage and cut material located between the blade and forward cross-member.

2. The tree cutting apparatus of claim 1, wherein said cutting edge extends around said blade means less than the entire peripheral edge.

3. The tree cutting apparatus of claim 2, wherein said drive means is adapted to rotate said blade means for less than one full rotation.

4. The tree cutting apparatus of claim 1, wherein said teeth along said cutting edge are spaced progressively closer together from said forward to rearward ends.

5. The tree cutting apparatus of claim 1, wherein said forward cross-member has gripping means thereon for gripping a tree to be cut and preventing transverse sliding movement of the forward cross-member with respect to the tree.

6. The tree cutting apparatus of claim 5, wherein said gripping means includes a straight blade mounted on the forward cross-member with teeth projecting forwardly of the forward cross-member, said teeth directed transversely so as to grip a tree located between the blade means and straight and cut the tree upon movement of the tree transversely away from the blade means, said straight blade located in a plane parallel and above the plane of the blade means.

* * * * *